(12) United States Patent
Loesch et al.

(10) Patent No.: US 10,151,336 B2
(45) Date of Patent: Dec. 11, 2018

(54) CLAMP DEVICE WITH RESILIENCE

(71) Applicant: MOBILITY HOLDINGS, LIMITED, Fortress Hill (HK)

(72) Inventors: Thomas Loesch, Fortress Hill (HK); Joakim Uimonen, Fortress Hill (HK); Eric Yi Hung Lin, Fortress Hill (HK)

(73) Assignee: MOBILITY HOLDINGS, LIMITED, Fortress Hill (HK)

( * ) Notice: Subject to any disclaimer, the term of this patent is extended or adjusted under 35 U.S.C. 154(b) by 453 days.

(21) Appl. No.: 14/816,462

(22) Filed: Aug. 3, 2015

(65) Prior Publication Data
US 2017/0037889 A1  Feb. 9, 2017

(51) Int. Cl.
| F16B 2/06 | (2006.01) |
| F16B 7/04 | (2006.01) |
| F16B 2/24 | (2006.01) |

(52) U.S. Cl.
CPC ............ *F16B 7/0486* (2013.01); *F16B 2/245* (2013.01); *Y10T 403/7176* (2015.01)

(58) Field of Classification Search
CPC .............. Y10S 411/927; Y10S 411/926; F16B 7/0493; F16B 2/245; F16B 2/246; F16B 7/0486; F16B 39/08; F16B 39/22–39/34; Y10T 403/7164; Y10T 403/7176; Y10T 403/7194; Y10T 24/344; Y10T 24/3444; Y10T 24/3449; Y10T 403/4614
See application file for complete search history.

(56) References Cited

U.S. PATENT DOCUMENTS

| 491,036 | A | | 1/1893 | Buckingham | |
| 606,461 | A | * | 6/1898 | Johnson | F16B 7/0493 403/395 |
| 1,070,948 | A | * | 8/1913 | Dodd | E04B 1/2612 174/71 R |
| 1,323,467 | A | * | 12/1919 | Hall | F16B 39/08 411/197 |
| 1,473,177 | A | | 11/1923 | Coyne | |
| 1,606,480 | A | * | 11/1926 | Reilly | F16B 39/08 411/198 |
| 2,398,160 | A | * | 4/1946 | Silver | F16G 11/12 403/46 |

(Continued)

FOREIGN PATENT DOCUMENTS

| EP | 2471701 A1 | 7/2012 | |
| FR | 2983927 A1 * | 6/2013 | ............. C25D 17/06 |

(Continued)

*Primary Examiner* — Josh Skroupa
*Assistant Examiner* — Matthew R McMahon
(74) *Attorney, Agent, or Firm* — Muncy, Geissler, Olds & Lowe, PC

(57) ABSTRACT

A clamp device with resilience can be coupled to a slender bar. The slender bar includes a connection rod and a bar shaft which are connected to each other. The clamp device with resilience includes a clamping portion and a fixing portion. The clamping portion includes two clamping plates for containing the connection rod. The fixing portion is connected to the clamping portion and adapted to fix the bar shaft in place. Rotation of the connection rod causes the two clamping plates to abut against polygonal vertices of the connection rod and therefore move away from each other. Therefore, the connection rod rotates by a fixed angle on each instance.

7 Claims, 2 Drawing Sheets

(56) References Cited

U.S. PATENT DOCUMENTS

| | | | | |
|---|---|---|---|---|
| 3,066,903 | A * | 12/1962 | Tinnerman | F16B 2/08 24/23 R |
| 3,536,281 | A | 10/1970 | Meehan et al. | |
| 3,562,873 | A * | 2/1971 | Cumber | F16B 2/246 403/397 |
| 3,582,118 | A * | 6/1971 | Hogan | F16B 33/002 16/19 |
| 3,722,930 | A * | 3/1973 | Humlong | B62K 21/12 403/395 |
| 3,827,815 | A | 8/1974 | Strange | |
| 4,476,673 | A | 10/1984 | Brown | |
| 4,617,775 | A * | 10/1986 | Padrun | E04C 5/163 24/545 |
| 5,068,948 | A * | 12/1991 | Blankenship | B60C 27/10 24/115 A |
| 6,096,009 | A * | 8/2000 | Windheuser | A61M 25/0097 24/339 |
| 6,390,721 | B1 * | 5/2002 | Wilson, II | F16B 7/0486 403/234 |
| 7,090,174 | B2 * | 8/2006 | Korczak | F16B 21/075 248/58 |
| 8,113,754 | B2 * | 2/2012 | Dahl | F16B 39/02 411/120 |
| 8,327,737 | B2 * | 12/2012 | Uimonen | B62K 21/16 74/551.3 |
| 8,439,316 | B2 * | 5/2013 | Feige | F16L 3/13 248/71 |
| 2005/0008451 | A1 * | 1/2005 | Groppo | B60C 27/02 411/431 |

FOREIGN PATENT DOCUMENTS

| | | | | |
|---|---|---|---|---|
| GB | 955110 | A * | 4/1964 | A47B 57/56 |
| GB | 2 227 053 | A | 7/1990 | |
| JP | 2014152916 | A | 8/2014 | |
| TW | I402198 | B | 7/2013 | |
| WO | WO2009054345 | A1 | 4/2009 | |

* cited by examiner

CLAMP DEVICE WITH RESILIENCE

BACKGROUND OF THE INVENTION

Field of the Invention

The present invention relates to leaf springs and more particularly to a clamp device with resilience for use with a stem of a folding bicycle.

Description of the Prior Art

Due to their portability, folding bicycles are in wide use. Regarding the structure of a conventional folding bicycle, a stem is fixed in place or disconnected by a connection device. For example, European Patent Application EP 2471701 A1 is directed to a folding device of a folding bicycle and discloses a connection device 40 thereof. During a folding bicycle manufacturing process, the step of connecting a first bar shaft 41 to a guide slot 433 of a rod 42 also entails coating the connection device 40 with a locking agent for preventing the connection device 40 from loosening.

However, in practice, the service life of the locking agent is never unlimited, because the connection device 40 of a bicycle gets loosened as a result of the vibration the bicycle in operation and repeated disassembly of the bicycle. Accordingly, the prior art still has room for improvement.

SUMMARY OF THE INVENTION

It is an objective of the present invention to provide a clamp device with resilience to solve the problem with the vibration and disconnection of a connection device (usually a slender bar) disposed in a folding structure of a stem of a folding bicycle.

In order to achieve the above and other objectives, the present invention provides a clamp device with resilience, for use in clamping a slender bar including a connection rod and a bar shaft, with the connection rod being a long polyhedron and including at least a polygonal vertex and at least a polygonal face. The clamp device with resilience comprises a clamping portion and a fixing portion. The clamping portion comprises: a first clamping plate; and a second clamping plate opposing the first clamping plate, wherein the second clamping plate and the first clamping plate together form a space for containing and clamping the connection rod. The fixing portion is connected to the clamping portion and adapted to receive the bar shaft. When the first clamping plate and the second clamping plate clamp the connection rod, a user rotates the connection rod to cause the first clamping plate and the second clamping plate to come into contact with the at least a polygonal vertex, such that the at least a polygonal vertex draws apart the first clamping plate and the second clamping plate, thereby causing the first clamping plate and the second clamping plate to move away from each other and allowing the connection rod to rotate by an angle.

According to an embodiment of the present invention, the first clamping plate and the second clamping plate are each a resilient plate.

According to an embodiment of the present invention, the resilient plate is a steel resilient plate or an iron resilient plate.

According to an embodiment of the present invention, the first clamping plate and the second clamping plate are parallel to each other.

According to an embodiment of the present invention, the connection rod comprises a thread portion, and the fixing portion comprises a hole penetrable by the thread portion.

According to an embodiment of the present invention, the clamping portion further comprises a top plate for pressing the connection rod to fix the connection rod in place.

According to an embodiment of the present invention, the first clamping plate and the second clamping plate each further comprise convolution portions corresponding in position to each other.

According to an embodiment of the present invention, the convolution portions are serrated and have rounded corners.

According to an embodiment of the present invention, the fixing portion comprises a curved bent arm corresponding in shape to the bar shaft.

DETAILED DESCRIPTION OF THE EMBODIMENTS

The present invention is hereunder illustrated with preferred embodiments.

Figure 1:
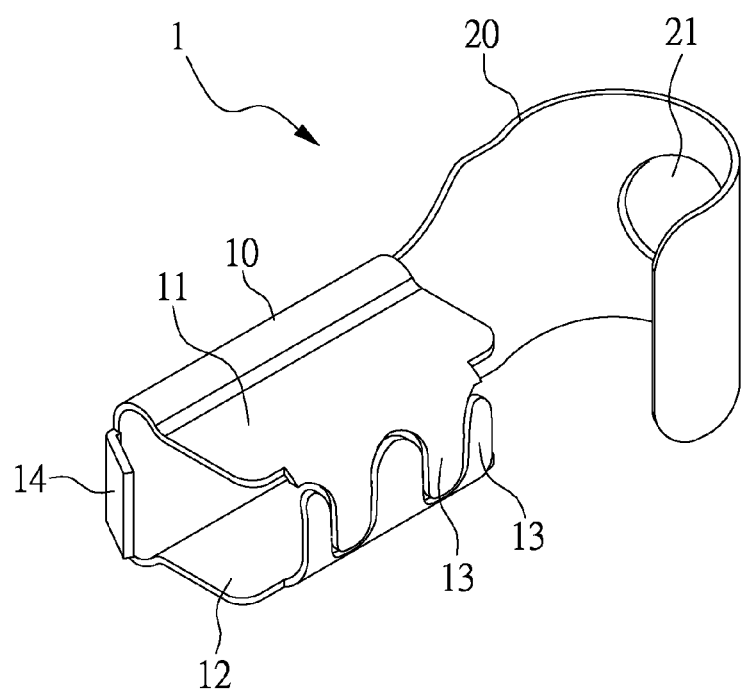
FIG. 1 is a perspective view of a clamp device with resilience according to the present invention.
Figure 2:
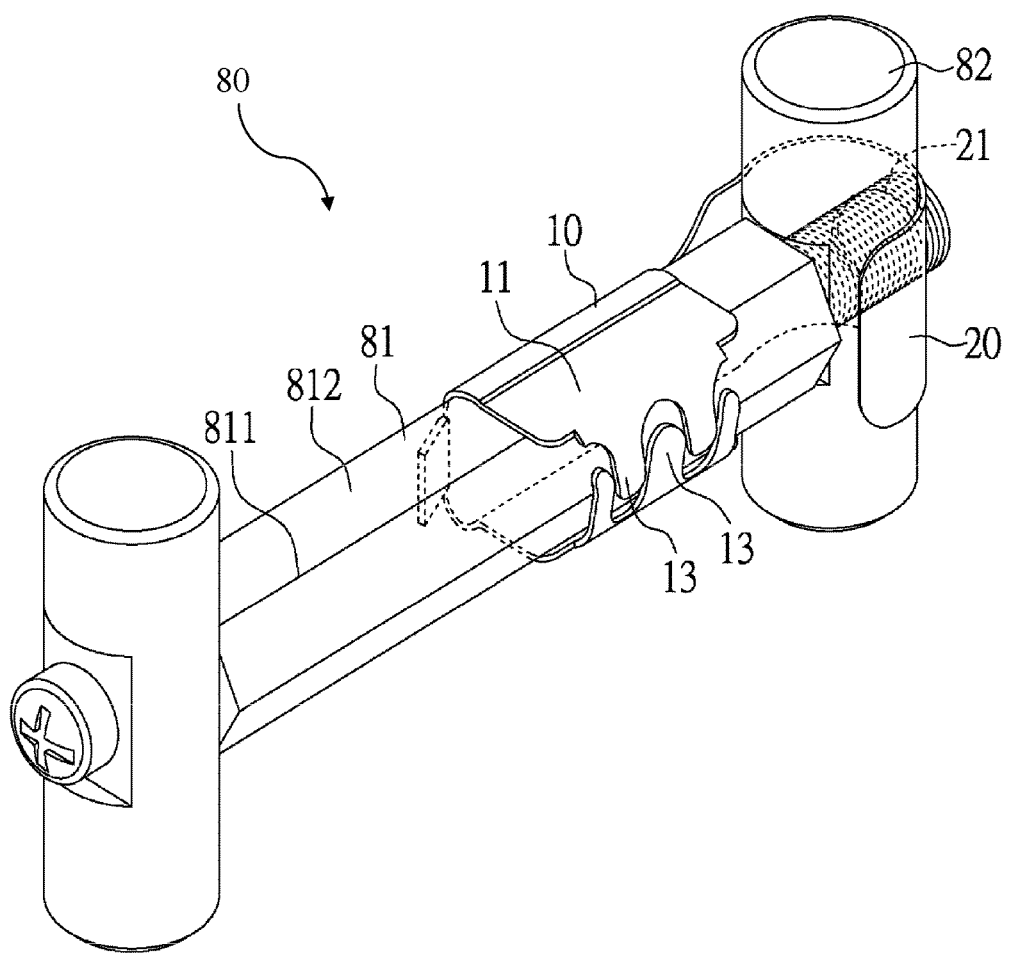
FIG. 2 is a schematic view of operation of the clamp device with resilience according to the present invention.

FIG. 1 is a perspective view of a clamp device 1 with resilience according to the present invention. FIG. 2 is a schematic view of operation of the clamp device 1 with resilience according to the present invention. Referring to FIG. 2, the clamp device 1 with resilience and a slender bar 80 are adapted to be coupled together. The slender bar 80 comprises a connection rod 81 and a bar shaft 82. In an embodiment of the present invention, the connection rod 81 is a hex bolt and comprises six polygonal faces 812 and six polygonal vertices 811. The bar shaft 82 is a stud. The connection rod 81 and the bar shaft 82 are threaded and therefore can be meshed with each other.

The clamp device 1 with resilience comprises a clamping portion 10 and a fixing portion 20. The clamping portion 10 is for containing and clamping the connection rod 81. The fixing portion 20 is for receiving and fixing the bar shaft 82 in place. In an embodiment of the present invention, the fixing portion 20 comprises a curved bent arm corresponding in shape to the bar shaft 82. The clamping portion 10 comprises a first clamping plate 11 and a second clamping plate 12. The first and second clamping plates 11, 12 are made of steel or iron and opposite each other to form a space therebetween for containing and clamping the connection rod 81. In an embodiment of the present invention, when the clamp device 1 with resilience and the slender bar 80 are coupled together, the connection rod 81 draws apart the first clamping plate 11 and the second clamping plate 12 which are made of steel or iron and therefore exhibit resilience such that the connection rod 81 can smoothly enter the containing space formed by the first clamping plate 11 and the second clamping plate 12. After the connection rod 81 has entered the containing space, the first clamping plate 11 and the second clamping plate 12 come into contact with the polygonal faces 812 and clamp the connection rod 81 under a clamping force exerted by the first clamping plate 11 and the second clamping plate 12. In an embodiment of the present invention, the first clamping plate 11 and the second clamping plate 12 are each a resilient plate made of steel, iron, any other metal with appropriate elasticity, or any other substance with appropriate elasticity.

In an embodiment of the present invention, the first clamping plate 11 and the second clamping plate 12 are parallel to each other. The connection rod 81, which is a hex bolt, has three pairs of parallel polygonal faces 812. Therefore, when the connection rod 81 is clamped by the clamp device 1 with resilience according to the present invention, one of the three pairs of polygonal faces 812 of the connection rod 81 come into contact with the first clamping plate 11 and the second clamping plate 12.

When the first clamping plate 11 and the second clamping plate 12 clamp the connection rod 81, a user rotates the connection rod 81 to cause a curved bent arm of the fixing portion 20 to receive and fix the bar shaft 82 in place to thereby keep the bar shaft 82 still but allow the connection rod 81 to rotate. The rotation of the connection rod 81 causes the first clamping plate 11 and the second clamping plate 12 to come into contact with the polygonal vertices 811 of the connection rod 81, and in consequence the first clamping plate 11 and the second clamping plate 12 are drawn apart from each other because of the relatively long distance between the polygonal vertices 811 (which join the diameter of the external circle of the hex bolt), thereby causing the first clamping plate 11 and the second clamping plate 12 to move away from each other. Therefore, the connection rod 81 is rotated by an angle on each instance. The rotation of the connection rod 81 by the angle causes the first clamping plate 11 and the second clamping plate 12 to come into contact with the next pair of polygonal faces 812, and in consequence the clamp device 1 with resilience restores its initial clamping state.

Due to the aforesaid structure, the connection rod 81 must be rotated by a fixed angle. For example, when the connection rod 81 in this embodiment is the hex bolt, the connection rod 81 is rotated by 60 degrees on each instance. According to the present invention, the connection rod 81 is not restricted to a hex bolt; hence, the connection rod 81 can work, provided that it has even-numbered pairs of polygonal faces. For example, the connection rod 81 can be a square bolt (rotated by 90 degrees on each instance), an octagonal bolt (rotated by 45 degrees on each instance), etc.

In an embodiment of the present invention, the fixing portion 20 further comprises a hole 21 penetrable by a thread portion of the connection rod 81 to thereby lengthen the journey of the connection between the connection rod 81 and the bar shaft 82 of the slender bar 80. In another embodiment of the present invention, the fixing portion 20 dispenses with the hole 21 and therefore reduces the amount of adjustment of the journey of the connection rod 81.

In an embodiment of the present invention, two polygonal vertices (at the bottom ends of the first clamping plate 11 and the second clamping plate 12) on one side of the clamping portion 10 can be manufactured to form rounded angles rather than right angles, so as to meet a process need. The clamping portion 10 further comprises a top plate 14 for abutting against and exerting a force upon the connection rod 81 to fix the connection rod 81 in place. If, to meet a process need, two polygonal vertices on one side of the clamping portion 10 are right angles, the top plate 14 will be dispensable such that the connection rod 81 can be fixed in place by allowing the one side of the clamping portion 10 to come into contact with a corresponding one of the polygonal faces 812 of the connection rod 81.

In an embodiment of the present invention, the first clamping plate 11 and the second clamping plate 12 each have a plurality of convolution portions 13. The convolution portions 13 are serrated and have rounded corners to thereby conform with the rise and fall of the polygonal vertices 811 protruding outward as a result of the rotation of the connection rod 81. That said, the present invention is not limited to the aforesaid shape of the convolution portions 13, as the convolution portions 13 can also take on any other appropriate shapes; for example, the convolution portions 13 can be triangularly serrated or squarely serrated.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A clamp device with resilience in combination with a bar comprising:
   the bar including a connection rod and a bar shaft, with the connection rod being a polyhedron and including at least a polygonal vertex, at least a polygonal face, and a thread portion, the thread portion extending from an end of the connection rod, wherein the connection rod and the bar shaft are threaded with each other through the thread portion; and
   the clamp device comprising:
      a clamping portion, comprising:
         a first clamping plate; and
         a second clamping plate opposing the first clamping plate, wherein the second clamping plate and the first clamping plate together form a space for containing and clamping the connection rod; and
      a fixing portion connected to the clamping portion and adapted to receive the bar shaft, wherein the fixing portion comprises a hole penetrable by the thread portion of the connection rod to lengthen a journey of a connection between the connection rod and the bar shaft of the bar, wherein, in the case of the first clamping plate and the second clamping plate clamping the connection rod and the connection rod being rotated, the first clamping plate and the second clamping plate come into contact with the at least a polygonal vertex, such that the at least a polygonal vertex draws apart the first clamping plate and the second clamping plate, thereby causing the first clamping plate and the second clamping plate to move away from each other and allowing the connection rod to rotate by an angle;
   wherein the fixing portion comprises a curved bent arm configured to surround at least a portion of the bar shaft.

2. The combination of claim 1, wherein the first clamping plate and the second clamping plate are each a resilient plate.

3. The combination of claim 2, wherein each resilient plate is one of a steel resilient plate and an iron resilient plate.

4. The combination of claim 1, wherein the first clamping plate and the second clamping plate are parallel to each other.

5. The combination of claim 1, wherein the clamping portion further comprises a top plate for pressing the connection rod to fix the connection rod in place.

6. The combination of claim 1, wherein the first clamping plate and the second clamping plate each further comprise convolution portions corresponding in position to each other.

7. The combination of claim 6, wherein the convolution portions are serrated and have rounded corners.

* * * * *